(12) United States Patent
Gordon et al.

(10) Patent No.: US 11,017,693 B2
(45) Date of Patent: May 25, 2021

(54) SYSTEM FOR ENHANCING SPEECH PERFORMANCE VIA PATTERN DETECTION AND LEARNING

(71) Applicant: International Business Machines Corporation, Armonk, NY (US)

(72) Inventors: Michael S. Gordon, Yorktown Heights, NY (US); Roxana Monge Nunez, San Jose (CR); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 15/826,124

(22) Filed: Nov. 29, 2017

(65) Prior Publication Data

US 2018/0197439 A1   Jul. 12, 2018

Related U.S. Application Data

(63) Continuation of application No. 15/402,475, filed on Jan. 10, 2017.

(51) Int. Cl.
*G09B 19/04* (2006.01)
*G10L 25/66* (2013.01)
(Continued)

(52) U.S. Cl.
CPC .............. *G09B 19/04* (2013.01); *G09B 7/04* (2013.01); *G10L 25/66* (2013.01); *G10L 25/30* (2013.01)

(58) Field of Classification Search
CPC ............ G09B 19/04; G09B 7/04; G10L 25/66
See application file for complete search history.

(56) References Cited

U.S. PATENT DOCUMENTS

| 3,760,108 | A | 9/1973 | Gacek et al. |
| 3,867,770 | A | 2/1975 | Davis |

(Continued)

FOREIGN PATENT DOCUMENTS

| EP | 1 499 271 | 11/2003 |
| WO | 03/091988 A2 | 11/2003 |

(Continued)

OTHER PUBLICATIONS

Office Action dated Sep. 11, 2018, received in a related U.S. Appl. No. 15/402,475.

(Continued)

*Primary Examiner* — Xuan M Thai
*Assistant Examiner* — Sadaruz Zaman
(74) *Attorney, Agent, or Firm* — Scully, Scott, Murphy & Presser, P.C.; Vazken Alexanian

(57) ABSTRACT

A method for enhancing speech performance includes communicating, via an input/output (I/O) device, speech data of a patient with speech problems, segmenting the speech data, generating one or more feature vectors based on at least the segmented speech data, determining whether the one or more feature vectors match with one or more recognition objects pre-trained using clinical data of one or more other patients, determining a speech disorder based on a matched result between the one or more feature vectors and the one or more recognition objects, and communicating, via the I/O device, one or more ameliorative actions for mitigating the determined speech disorder.

13 Claims, 9 Drawing Sheets

(51) Int. Cl.
*G09B 7/04* (2006.01)
*G10L 25/30* (2013.01)

(56) References Cited

U.S. PATENT DOCUMENTS

| | | | |
|---|---|---|---|
| 4,460,342 A | 7/1984 | Mills | |
| 4,611,298 A | 9/1986 | Schuldt | |
| 4,802,228 A | 1/1989 | Silverstein et al. | |
| 5,487,671 A * | 1/1996 | Shpiro | G09B 7/04 434/185 |
| 5,870,709 A | 2/1999 | Bernstein | |
| 6,044,346 A * | 3/2000 | Ali | G10L 15/285 704/231 |
| 6,231,500 B1 | 5/2001 | Kehoe | |
| 7,258,660 B1 | 8/2007 | Sarfati | |
| 7,292,985 B2 | 11/2007 | Jiang et al. | |
| 7,634,409 B2 * | 12/2009 | Kennewick | G10L 15/08 704/257 |
| 7,762,264 B1 | 7/2010 | Ramig et al. | |
| 8,078,473 B1 * | 12/2011 | Gazdzinski | B66B 3/002 704/275 |
| 8,275,624 B2 | 9/2012 | Kehoe | |
| 8,600,758 B2 | 12/2013 | Deshmukh et al. | |
| 9,190,061 B1 * | 11/2015 | Shemer | G10L 25/78 |
| 9,685,174 B2 * | 6/2017 | Karam | A61B 5/7267 |
| 9,972,339 B1 * | 5/2018 | Sundaram | G10L 25/78 |
| 10,223,934 B2 * | 3/2019 | Paul | A61B 5/7264 |
| 10,448,115 B1 * | 10/2019 | Jamal | H04N 21/42203 |
| 10,803,851 B2 * | 10/2020 | Sun | G10L 15/063 |
| 2005/0125225 A1 * | 6/2005 | Manu | G10L 15/01 704/237 |
| 2006/0008781 A1 * | 1/2006 | Townshend | G09B 17/006 434/178 |
| 2006/0177799 A9 | 8/2006 | Stuart et al. | |
| 2009/0275005 A1 | 11/2009 | Haley | |
| 2010/0174533 A1 | 7/2010 | Pakhomov | |
| 2011/0123965 A1 * | 5/2011 | Yu | G09B 19/04 434/156 |
| 2012/0116772 A1 | 5/2012 | Jones et al. | |
| 2014/0022184 A1 | 1/2014 | Bathiche et al. | |
| 2014/0038160 A1 | 2/2014 | Shani et al. | |
| 2014/0342324 A1 | 11/2014 | Ghovanloo et al. | |
| 2015/0318002 A1 * | 11/2015 | Karam | G10L 25/48 704/231 |
| 2016/0140321 A1 | 5/2016 | Bowers et al. | |
| 2016/0183868 A1 * | 6/2016 | Rot | A61B 5/4803 434/185 |
| 2016/0189566 A1 | 6/2016 | Rot et al. | |
| 2016/0351074 A1 * | 12/2016 | Paul | A61B 5/7264 |
| 2018/0047395 A1 * | 2/2018 | Sommers | G10L 15/265 |
| 2018/0122362 A1 * | 5/2018 | Li | G10L 13/00 |
| 2018/0197438 A1 * | 7/2018 | Gordon | G09B 19/04 |
| 2018/0197439 A1 * | 7/2018 | Gordon | G10L 25/66 |
| 2018/0214061 A1 * | 8/2018 | Knoth | G10L 17/26 |
| 2018/0342174 A1 * | 11/2018 | Zhang | G06F 17/2715 |
| 2019/0043610 A1 * | 2/2019 | Vaughan | G16H 50/20 |
| 2020/0285700 A1 * | 9/2020 | Narayanan | G06F 40/279 |
| 2020/0357406 A1 * | 11/2020 | York | G10L 15/1815 |

FOREIGN PATENT DOCUMENTS

| | | |
|---|---|---|
| WO | 20111069095 A2 | 6/2011 |
| WO | 20141062441 A1 | 4/2014 |

OTHER PUBLICATIONS

Office Action dated Jan. 11, 2019, received in a related U.S. Appl. No. 15/402,475.

Byrne M., "Machine Learning Algorithm Spots Depression in Speech Patterns", http://motherboard.vice.com/read/machine-learning-algorithm-spots-depression-based-on-speech-patterns, Jul. 9, 2016, 8 pages, Accessed on Nov. 4, 2016.

Czyzewski A., et al., "Intelligent Processing of Stuttered Speech", Journal of Intelligent Information Systems, pp. 1-49 (Sep. 2003).

Godino-Llorente, J.I. et al., "Automatic Detection of Voice Impairments from Text-Dependent Running Speech", Biomedical Signal Processing and Control 4:176-182 (Mar. 9, 2009).

Laaridh I. et al., "Automatic Detection of Phone-Based Anomalies in Dysarthic Speech", ACM Transactions on Accessible Computing 6(3)Article 9:9:1-9:24 (May 2015).

Maier A., et al., "Automatic Detection of Articulation Disorders in Children With Cleft Lip and Palate", Journal of Acoustical Society of America 126(5):2589-2602 (Nov. 2009).

Oue S., et al., "Automatic Dysfluency Detection in Dysarthric Speech Using Deep Belief Networks", SPLAT 2015, 6th Workshop on Speech and Language Processing for Assistive Technologies, pp. 60-64 (2015).

Waheed, K., et al., "A Robust Algorithm for Detecting Speech Segments Using an Entropic Contrast", https://www.researchgate.net/publication/4007852_A_robust_algorithm_for_detecting_speech_segments_using_an_entropic_contrast, Conference Paper, The 2002 45th Midwest Symposium on Circuits and Systems, 5 pages, vol. 3 (Sep. 2002).

Zhang J. et al., "A Computer-Assist Algorithm to Detect Repetitive Stuttering Automatically", 2013 International Conference on Asian Language Processing (IALP), 4 pages (Aug. 17-19, 2013).

"Child Speech and Language", http://www.asha.org/public/speech/disorders/ChildSandL.htm, American Speech-Language-Hearing Association (ASHA), 2 pages, Accessed on Nov. 4, 2016.

"Early Detection of Speech, Language, and Hearing Disorders", http://www.asha.org/public/Early-Detection-of-Speech-Language-and-Hearing-Disorders/, American Speech-Language-Hearing Association (ASHA), 3 pages, Accessed on Oct. 28, 2016.

"Statistics on Voice, Speech, and Language", https://www.nidcd.nih.gov/healthistatisticsistatistics-voice-speech-and-language, National Institute on Deafness and Other Communication Disorders (NIDCD), 9 pages, Last Updated Jun. 7, 2010,Accessed on Nov. 3, 2016.

"Stuttering", http://www.asha.org/public/speech/disorders/stuttering/, American Speech-Language-Hearing Association (ASHA), 7 pages, Accessed on Oct. 28, 2016.

List of IBM Patents or Patent Applications Treated as Related, dated Nov. 29, 2017, 2 pages.

Notice of Allowance dated Aug. 9, 2019 from related U.S. Appl. No. 15/402,475.

* cited by examiner

PATIENT 1

CLASS-A DATA

- SPEECH DATA ~ 201

- ABNORMAL SPEECH PATTERN RECOGNIZED RESPONSIVE TO THE SPEECH DATA ~ 202

- CONTEXT DATA ~ 203

- SPEECH DISORDER DIAGNOSED RESPONSIVE TO THE ABNORMAL SPEECH PATTERN AND THE CONTEXT DATA ~ 204

CLASS-B DATA

- AMELIORATION ACTIONS SUGGESTED RESPONSIVE TO THE DIAGNOSED SPEECH DISORDER ~ 205

- REMEDY PROGRESS ~ 206

PATIENT 2

CLASS-A DATA

CLASS-B DATA

SYSTEM FOR ENHANCING SPEECH PERFORMANCE VIA PATTERN DETECTION AND LEARNING

FIELD

The present disclosure relates to a speech performance enhancement system, and more particularly, to a method for diagnosing a speech disorder for an individual and automatically suggesting ameliorative actions for the diagnosed speech disorder, and a system and computer product using the method.

BACKGROUND

Importance of early diagnosis and mitigation for speech disorders has been increased. The speech disorders includes a child apraxia of speech (CAS), dysarthria, orofacial myofunctional disorder (OMD), etc., depending on causes of the disorders. The CAS is a motor speech disorder. Children with the CAS have problems saying sounds, syllables, and words. The brain has problems planning to move the body parts (e.g., lips, jaw, tongue) needed for speech. The dysarthria is also a motor speech disorder. It results from impaired movement of the muscles used for speech production, including the lips, tongue, vocal folds, and/or diaphragm. The type and severity of dysarthria depend on which area of the nervous system is affected. The child knows what he or she wants to say, but his/her brain has difficulty coordinating the muscle movements necessary to say those words. With the OMD, the tongue moves forward in an exaggerated way during speech and/or swallowing. The tongue may lie too far forward during rest or may protrude between the upper and lower teeth during speech and swallowing, and at rest.

The speech disorders further includes an articulation disorder, a fluency disorder, and resonance or voice disorder, etc., depending on observed speech problems. The articulation disorder is related to difficulties in producing sounds in syllables or saying words. The fluency disorder is related to a dysfluency (e.g., stuttering) in which the flow of speech is interrupted by abnormal stoppages, partial-word repetitions (e.g., "b-b-boy"), or prolonging sounds and syllables (e.g., "sssssnake"). The resonance or voice disorder is related to abnormality in a pitch, volume, or quality of the voice.

To enhance a speech performance or mitigate the speech disorders that individuals suffered from, accurate diagnosis for a type of speech disorder and optimal ameliorative actions are needed.

SUMMARY

In an aspect of the present invention, a system for enhancing a speech performance is provided. The system includes an input/output (I/O) device, a speech analyzer device, a speech recognition device, a processing device, a memory device, and a bus operably coupling devices. The I/O device communicates speech data of a patient. The speech analyzer device performs segmenting on the speech data. The speech recognition device generates one or more feature vectors based on at least the segmented speech data, determining whether the one or more feature vectors match with one or more recognition objects pre-trained therein using clinical data collected from one or more other patients, and determines a speech disorder based on a matched result between the one or more feature vectors and the one or more recognition objects. The processing device communicates, via the I/O device, one or more ameliorative actions for mitigating the determined speech disorder.

In an aspect of the present invention, a computer-implemented method for enhancing speech performance is provided. The method includes communicating speech data of a patient, segmenting the speech data, generating one or more feature vectors based on at least the segmented speech data, determining whether the one or more feature vectors match with one or more recognition objects pre-trained using clinical data collected from one or more other patients, determining a speech disorder based on a matched result between the one or more feature vectors and the one or more recognition objects, and communicating, via the I/O device, one or more ameliorative actions for mitigating the determined speech disorder.

In an aspect of the present invention, a computer program product comprising a computer readable storage medium having computer readable program instructions embodied therewith is provided. The computer readable program instructions executable by at least one processor to cause a computer to perform a computer-implemented method. The method includes communicating, via an input/output (I/O) device, speech data of a patient, segmenting the speech data, generating one or more feature vectors based on at least the segmented speech data, determining whether the one or more feature vectors match with one or more recognition objects pre-trained using clinical data collected from one or more other patients, determining a speech disorder based on a matched result between the one or more feature vectors and the one or more recognition objects, and communicating, via the I/O device, one or more ameliorative actions for mitigating the determined speech disorder.

BRIEF DESCRIPTION OF THE DRAWINGS

FIG. 1C depicts an example content of clinical data according to an exemplary embodiment of the present invention;

DETAILED DESCRIPTION

Embodiments of the present invention will now be described in detail with reference to the drawings. However, the following embodiments do not restrict the invention claimed in the claims. Moreover, all combinations of features described in the embodiments are not necessarily mandatory for the architecture of the present invention. Like numbers are assigned to like elements throughout the description of the embodiments of the present invention.

According to exemplary embodiments of the present invention, a method, system, and computer product for diagnosing a speech disorder, suggesting one or more ameliorative actions for mitigating the diagnosed speech disorder, and/or assisting a patient diagnosed with a speech disorder to practice the one or more ameliorative actions. A system for enhancing a speech performance according to the present invention is also referred to herein as a "speech enhancement system". The term "patient" may be understood to include an individual under diagnosis with speech problems.

Figure 1A:
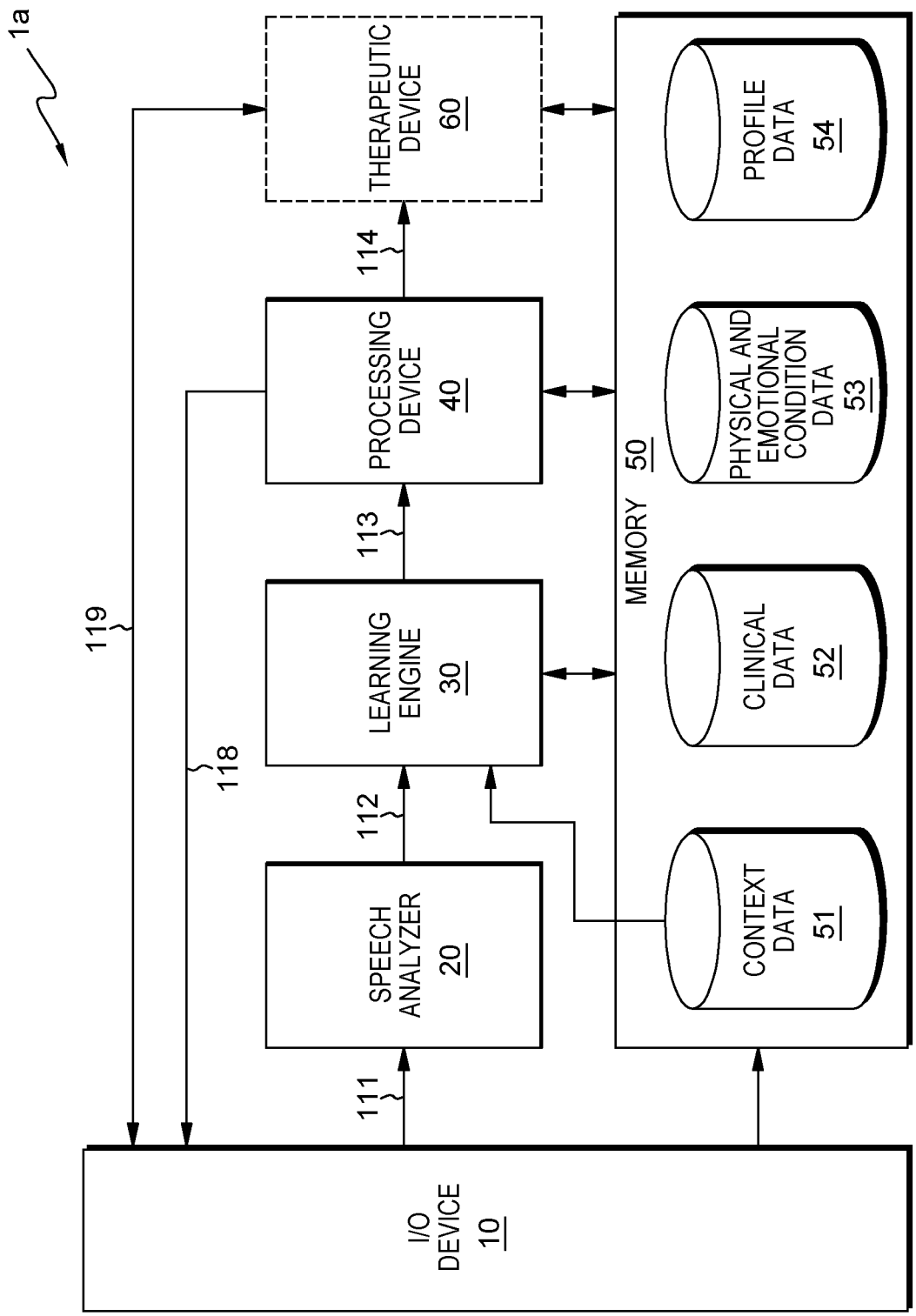
FIG. 1A is a block diagram of a speech enhancement system according to an exemplary embodiment of the present invention.

FIG. 1A is a block diagram of a speech enhancement system 1a according to an exemplary embodiment of the present invention.

Referring now to the example depicted in FIG. 1A, the speech enhancement system 1a may include an input/output (I/O) device 10, a speech analyzer 20, a learning engine 30 (i.e., speech recognition device), a processing device 40, and a memory device 50. The I/O device 10 may receive voice or speech data input from a patient and transfer the voice or speech data 111 to the speech analyzer 20. Further, patient context data may be input via the I/O device 10, stored into the memory device 50, and provided to the processing device 40. The processing device 40 may analyze the patient context data 51 to generate and communicate (via the I/O device 10) initial instructions or relevant questions to a patient when an interview for diagnosis is commenced by the speech enhancement system 1a; this feature will be described later in more detail with reference to FIG. 4B.

The speech analyzer 20 may perform a speech analysis on the speech data 111 input via the I/O device 10 and provide analyzed output data 112 to the learning engine 30. The speech analysis may include segmenting the speech data and/or analyzing to detect a pitch of speech, a gap between speech segments, a frequency of speech segments, a volume of speech, etc. Next, the output data 112 generated by the speech analyzer 20 may be input to the learning engine 30 for recognizing speech disorder. In some embodiments, the learning engine 30 may be embodied using a deep neural network (DNN) which is a well known speech recognition platform to a skilled person in the art. Further, the patient context data 51 may be input to the learning engine 30 to be used for the speech disorder recognition. In this example, the data 112 and the patient context data 51 may be converted into feature vectors (e.g., multi-dimensional vectors of numerical features that represent the data 112 and the patient context data 51). The feature vectors may be suitable for processing and statistical analysis in the learning engine 30, and may be compared with recognition objects pre-trained in the learning engine 30. Thus, a speech disorder may be recognized by a result of comparing the feature vectors of the data 112 and the patient context data 51 against the pre-trained recognition objects within the learning engine 30.

Figure 1B:
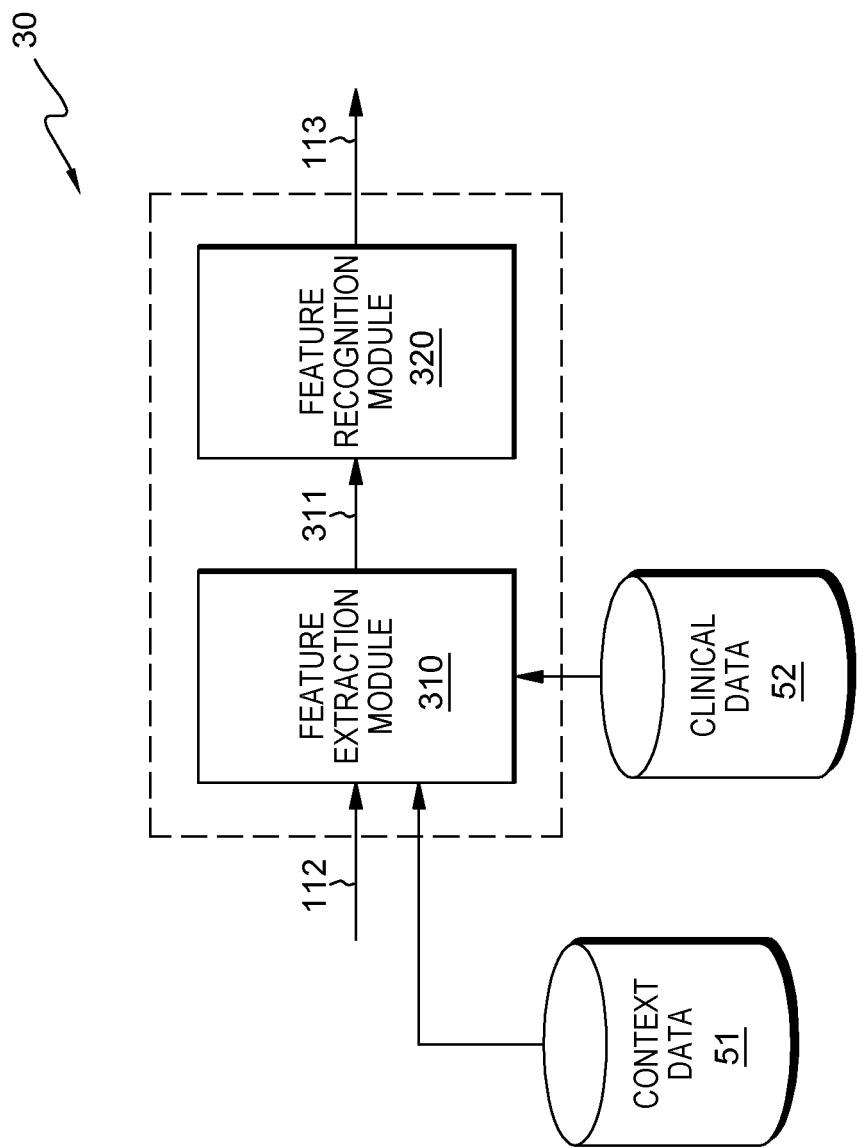
FIG. 1B depicts an example block diagram of a learning engine according to an exemplary embodiment of the present invention.

FIG. 1B depicts an example block diagram of a learning engine 30 according to an exemplary embodiment of the present invention. Referring now to the example depicted in FIG. 1B, the learning engine 30 may include a feature extraction module 310 and a feature recognition module 320. The feature extraction module 310 may receive the data 112 of the speech analyzer 20 and the patient context data 51 and extract feature vectors 311 from the data 112 and the patient context data 51. The feature recognition module 320 may compare the feature vectors 311 extracted from the data 112 and the patient context data 51 with pre-trained recognition objects and may recognize a speech disorder. In some aspects, the feature recognition module 320 may be pre-trained using various training data such as the clinical data 52 (collected from other patients); for example, speech data, context data, and speech disorders recognized (or diagnosed) responsive to such speech data and context data. The clinical data 52 may be input to the feature recognition module 320 for training it via the feature extraction module 310.

FIG. 1C depicts an example content of clinical data 52 according to an exemplary embodiment of the present invention. The clinical data 52 may be collected from cohorts of other patients. Referring now to the example depicted in FIG. 1C, the clinical data 52 may include, but is not limited to, each patient's class-A and class-B data. The class-A data may include: a corresponding patient's speech data 201 (which may be input to the speech enhancement system 1a when performing an interview with the patient); an abnormal speech pattern 202 (e.g., speech problem) recognized responsive to the speech data 201; context data 203; and a speech disorder 203 diagnosed responsive to the speech pattern 202 and/or the context data 203. The abnormal speech patterns may include, but are not limited to, stutterings, mumblings, abnormal stoppages, partial-word repetitions (e.g., "b-b-boy"), prolonging sounds and syllables (e.g., "sssssnake"), and excessively high volume. The class-B data may include ameliorative actions 205 suggested responsive to the diagnosed speech disorder and mitigation progresses 206 (e.g., a degree of speech enhancement, a period of the mitigate action, a degree of a patient's interest) with the applied ameliorative actions. The clinical data 52 may be collected by therapeutic devices (e.g., 60 of FIG. 1A) during or after each other patient taking ameliorative actions, or may be input by a healthcare professional or similar.

Referring back to FIG. 1B, when the learning engine 30 may be pre-trained using, e.g., the class-A data of the clinical data 52, the learning engine 30 could classify (or recognize) the output data 112 of the speech analyzer 20 and the patient context data 51 into one or more of speech disorders (or problems) which respectively correspond to the recognition objects pre-trained using the class-A data 201 to 204 of the clinical data 52. The speech disorders or problems can be recognized by the speech enhancement system 1a may include, but are not limited to: CAS, dysarthria, OMD, an articulation disorder, a fluency disorder, resonance or voice disorder, Parkinson's disease, a decreased strength and control over articulator muscles, a language disorder. By way of example, since the learning engine 30 has learned and known mapping relationships among speech data, context data, and speech disorders owing to the aforementioned pre-training using the class-A data 201 to 204, the learning engine 30 could determine a speech disorder corresponding to a specific combination of speech data (or abnormal speech patterns) and the context data. Thus, as the clinical data 52 of other patients are continuously updated and used to train the learning engine 30, a speech pattern recognition accuracy of the learning engine 30 may be improved accordingly.

Referring back to FIG. 1A, the processing device 40 may receive data 113 indicating a diagnosed speech disorder from the learning engine 30, and determine one or more suggested ameliorative actions corresponding to the diagnosed speech disorder, using at least one of the patient context data 51, the clinical data 52 collected from cohorts of other patients with similar speech problems, patient physical and emotional condition data 53, and patient profile data 54 including patient progress data (e.g., patient's historical performance data). The determined one or more suggested ameliorative actions may be provided to the patient, or a healthcare professional, or the like, via the I/O device 10.

In some embodiments, the speech enhancement system 1a may further include a therapeutic device 60 which receives data 114 indicating one or more suggested ameliorative actions and assists a patient in practicing the suggested one or more ameliorative actions. By way of example, the ameliorative actions may include, but are not limited to: (1) playing specific music songs that encourage the patient to practice a weakness that has been identified; (2) requesting sounds that encourage the patient to practice the weakness that has been identified (e.g., "How does the lion roar?", "How does the snake flick its tongue?", etc); (3) playing relax therapy music for breath exercises; (4) having the patient playing a game in which a speech improvement exercise is embedded or a vision-driven game to practice specific pronunciations; and (5) playing audible stories to the patient that emphasize target sounds/word or phrases. The therapeutic device 60 may interact with a patient via the I/O device 10 and an interface channel 119 for having the patient practice according to the suggested one or more ameliorative actions. Although the therapeutic device 60 is illustrated as being separated from other elements of the speech enhancement system 1a in FIG. 1A, exemplary embodiments of the present invention are not limited thereto. For example, the therapeutic device 60 may be embodied as a hardware or program module in the processing device 40 or a program module stored in the memory device 50.

By way of example, the patient context data 51 may include a patient's family background, a patient's language environment (e.g., whether a patient is in a multilingual environment, what is a patient's native language, etc.), a patient's age, a patient's gender, a patient's occupation, a patient's culture, a patient's residential region, etc. The context data 203 included in the clinical data 52 (FIG. 1C) may include substantially the same kinds of data sets as the patient context data 51. The patient progress data 54 may include, but are not limited to: a degree of speech enhancement, a period of the mitigate action, a degree of the patient's interest, a frequency at which actions are taken, whether actions are taken as suggested (e.g., whether the patient is achieving ameliorative action's expectations such as moving his or her mouth in a specific way), etc. The patient progress data 54 may be collected by a therapeutic device 60 during or after the patient's taking ameliorative actions or input by a healthcare professional or similar, and stored in the memory device 50. The patient physical or emotional condition data 53 may include, but are not limited to: a patient's mood, a patient's interest on taking a mitigate action, a patient's breathing or heart rate while speaking, a healthcare professional's (or a patient's or care giver's) instant feedback as to a patient's interest, etc. The patient physical or emotional condition data 53 may be collected by the therapeutic device 60 during or after the patient's taking ameliorative actions or provided as input by a patient, care giver, or healthcare professional.

In some embodiments, the speech disorder diagnosis for a patient may be made in a way that the speech enhancement system 1a interviews the patient by giving instructions or questions to the patient and the patient follows the instructions or answering the questions via the I/O device 10 and recording patient's responses. In one example, initially, the processing device 40 may generate instructions (or questions) to be given to the patient based an analysis result on the patient context data 51. The processing device 40 may identify instructions (or questions) which are most likely relevant to fast and accurate diagnosis. In some aspects, the instructions (or questions) may be updated by further consideration on a speech or voice analysis result input by the patient during a diagnosis process. For example, when it is determined based on the speech analysis result that a certain patient has a trouble with a specific word, the processing device 40 may provide feedback to the patient with updated instructions (or questions) via a feedback channel 118 to repeat the word, so that the processing device 40 may use analytics for further detailed analysis of the word. In another example, when a patient is stuttering, the feedback may include a suggestion to "slow down, repeat what you said, slowly, stay calm" for getting more clear and better quality of speech data input. However, in other embodiments, the above-mentioned interview process might not be performed, for example, the speech enhancement system 1a may request that the patient simply recite words or test and the system 1a receives and monitors the patient's speech and/or utterances, without providing the instructions or questions to the patient. Further, in still other embodiments, the patient may give permission for the system 1a to monitor in real-time and/or record his or her standard, (daily) voice interactions with an I/O device such as an AI listener 10a which will be described later in detail with reference to FIG. 3. The AI listener 10a may be placed at home and may be capable of voice interaction, music playback, making to-do lists, setting alarms, providing weather information, etc. to the patient, the system 1a may use the speech sounds or words monitored and/or recorded through the AI listener 10a as speech input data for speech disorder diagnosis.

In some embodiments, the processing device 40 may use the patient context data 51 to determine one or more ameliorative actions which work best for a patient. In one example, if the patient is an adult, the processing device 40 may determine and recommend different actions than those applied to a child patient. In another example, the processing device 40 may detect what potentially causes a decrease of a patient's speech performance based on the patient context data 51 and alert the patient or a healthcare professional. In an example, if the patient context data 51 is provided with the following information: e.g., a patient has played with someone (e.g., patient cousin or friend) who speaks incorrectly or has watched a T.V. show where words are pronounced incorrectly and the patient starts to pronounce a certain word incorrectly, the processing device 40 may suggest the patient or a healthcare professional refraining from doing the above activities that negatively affect the patient's speech performance.

In some embodiments, the processing device 40 may use the patient profile data 54 such as a patient historical performance data to determine one or more ameliorative actions which work best for the patient. For example, different actions may be determined according to whether the patient is new or familiar with recommended ameliorative actions. In some embodiments, the processing device 40 may use the patient physical or emotional condition data 53 such as a patient's breathing or heart rate to determine one or more ameliorative actions which work best for the patient: in one example, the processing device 40 may learn how the physical or emotional conditions affect the patient's progress in developing speech performance, if determined to be necessary, a feedback to control the patient's breathing may be provided to the patient; and in another example, the processing device 40 may adaptively change ameliorative actions to be applied for the patient based on the patient's mood or progress.

In another example, the processing device 40 may determine with a certain level of confidence that the patient is becoming impatient, nervous, or bored on a specific action, in such cases, a different action may be proposed or incentive schemas may be in place to encourage the patient's more active participation. In a still another example, the processing device 40 may use a patient or care giver's instant feedback (e.g., as to whether the patient likes a recommended action) to determine one or more ameliorative actions for the patient.

Although it is illustrated in FIG. 1A that the elements 10 to 60 of the speech enhancement system 1*a* are implemented into a single standalone system, being operably connected to each other via short wired (e.g., internal) paths therein, it is understood that exemplary embodiments are not limited thereto. For example, at least one of the elements 10 to 60 may be remotely located from others, being connected via a communication network; in other words, at least one of the interface channels connecting the elements 10 to 60 may be implemented using a communication network. In some embodiments, the communication network may include wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, or the like.

Although it is illustrated in FIG. 1B that the patient context data 51, the clinical data 52, the patient physical and emotional condition data 53, and the patient profile data 54 are stored into the memory device 50, exemplary embodiments of the present invention are not limited thereto. For example, some of the data 51 to 54 may be stored into other separate memory device (not shown) as database based on a knowledge base, an N-dimensional array (N is greater than 1), etc.

Figure 2:
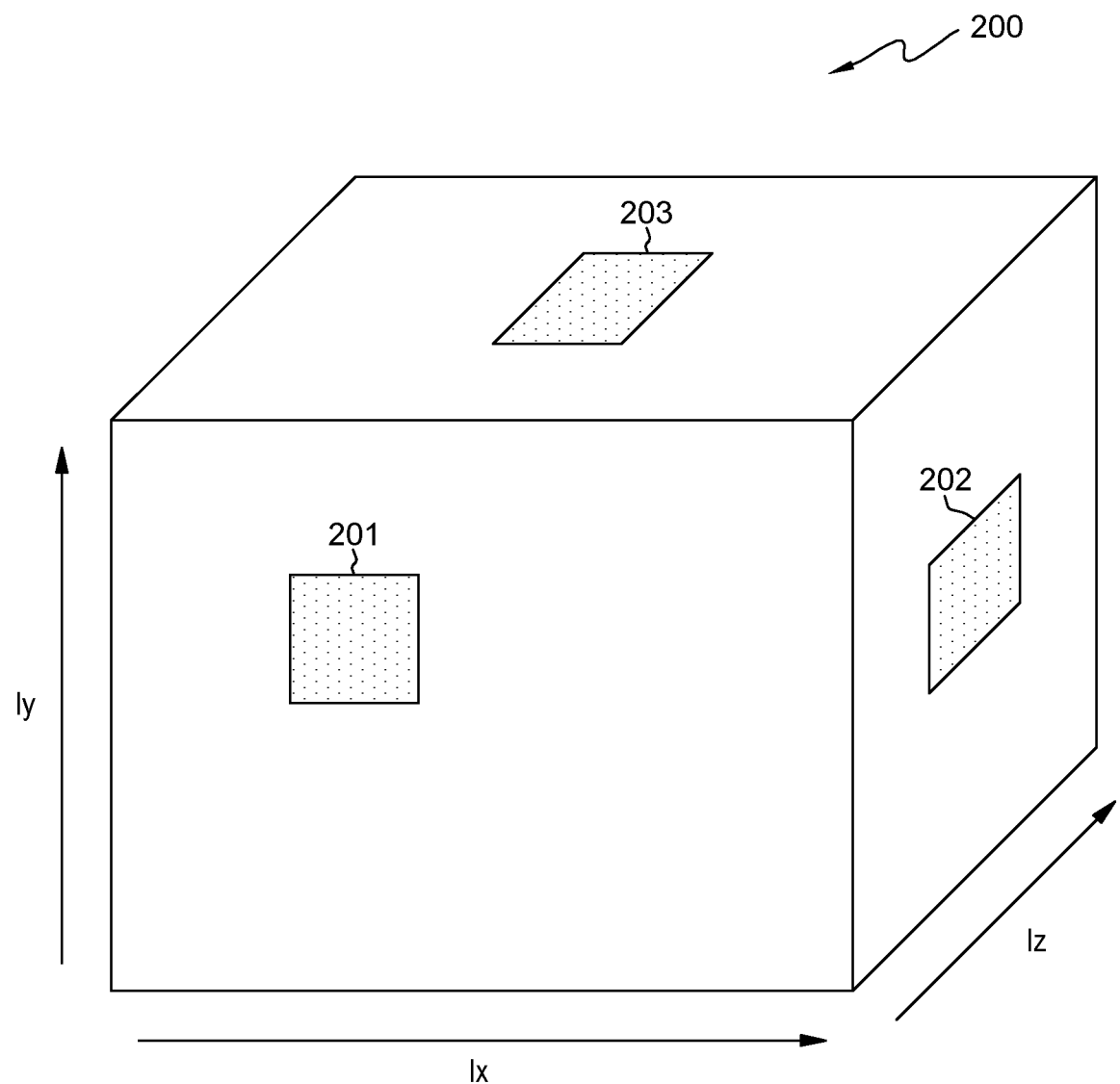
FIG. 2 depicts an example structure of an N-dimensional (N is an integer greater than 1) database accessed by a speech enhancement system according to an exemplary embodiment of the present invention.

FIG. 2 depicts an example structure of an N-dimensional database accessed by a speech enhancement system according to an exemplary embodiment of the present invention.

In FIG. 2, a three-dimensional (3D) database 200 where three kinds of indices Ix, Iy, and Iz are used to point to specific data outcomes 201 to 203 such as relevant ameliorative actions, relevant therapeutic devices for having patients practice the ameliorative actions, relevant healthcare professionals who specialized in particular conditions defined by the indices. One index (e.g., Ix) of the indices Ix, Iy, and Iz may be a diagnosed type of speech disorder, and the remained indices (e.g., Iy and Iz) may be selected from the following exemplary parameters: (1) whether the patient is alone or with a caregiver or aid; (2) physical characteristics of the patient (that affect the speech); (3) whether the patient is familiar or unfamiliar with the speech enhancement system 1*a* or the therapeutic device according to the present invention (whether the patient have used the system 1*a* before); (4) a progression of problems or diseases of the patient, (5) history of problems for the patient; (6) a progression of problems or diseases of a cohort associated with the patient, (7) a history of problems for the cohort; and (8) data corresponding to the patient context data 51 (FIG. 1A), etc. In some aspects, each of the candidate indices may be managed by giving different weights depending on its degree of importance. As depicted in FIG. 2, each of various combinations of the indices Ix, Iy, and Iz may exclusively point to one of the specific data outcomes 201 to 203. In some aspects, a list of the parameters or an output indexed by a combination of selected ones from the parameters may be changed (or updated) when the system 1*a* learns as to what is more effective to the patient or the cohort. For example, the processing device 40 may look up the three-dimensional database to determine one or more ameliorative actions corresponding to the diagnosed speech disorder.

By way of example, one mapping relationship between diagnosed speech disorders (or problems) and corresponding ameliorative actions is for a patient diagnosed with Parkinson's disease, whereby the system 1*a* provides an ameliorative action by triggering what is known as "The Lee Silverman Voice Treatment", which focuses the patient to increase vocal loudness, e.g., in sixteen one-hour sessions spread over four weeks. Here, the aim is to retrain speech skills through building new motor programs or skills through regular practice. By another way of example, if a patient is diagnosed as exhibiting decreased strength and control over articulator muscles, an ameliorative action may be to suggest to the patient exercising to increase the strength of these muscles. By still another way of example, if a patient is diagnosed as having challenges of other mouth movements, an ameliorative action may be to have the patient repeating words and syllables many times in order to the proper mouth movements. By still another way of example, if a patient is diagnosed with dysarthria, an ameliorative action may be to provide an augmentative and alternative communication (AAC) device (will be described in the following paragraph). By still another way of example, if a patient is a child diagnosed with language challenges, an ameliorative action may be letting the child interact the speech enhancement system 1*a* (e.g., the therapeutic device 60 of FIG. 1A) or similar by playing and talking, using pictures and multimedia stories to stimulate language development. The system 1*a* may also model correct vocabulary and grammar and use repetition exercises to build language skills. Also, the system 1*a* may physically show the child how to make certain sounds with animations of how to move the tongue to produce specific sounds. Although a 3D database is depicted in FIG. 2, it is understood that exemplary embodiments of the present invention are not limited thereto.

In some embodiments, the speech enhancement system 1*a* may further include an AAC device (not shown) that make coping with speech disorders (e.g., dysarthria) easier. The AAC device may include a speech synthesis module, a text-based telephones, etc. which allow individuals (who are not intelligible, or may be in the later stages of a progressive illness), to continue to be able to communicate without the need for fully intelligible speech. For example, if the speech enhancement system 1*a* may detect (based on a historical data of the patient) that a speech disorder of a certain patient has progressed to an extent that the patient needs an aid of a certain AAC, the speech enhancement system 1*a* may look up a relevant AAC method or device from a database (e.g., the N-dimensional database 200 of FIG. 2). By way of example, one index (e.g., Ix) of the indices Ix, Iy, and Iz may be a diagnosed type of speech disorder, and the remained indices (e.g., Iy and Iz) may be selected from the following exemplary parameters: (1) whether the patient is alone or with a caregiver or aid; (2) physical characteristics of the patient (that affect the speech); (3) whether the patient is familiar or unfamiliar with the AAC device; (4) progression of problems or diseases of the patient, (5) history of problems for the patient (6) progression of problems or diseases of a cohort associated with the patient, (7) history of problems for the cohort; and (8) data corresponding to the patient context data 51 (FIG. 1A), etc. In a further example, the indices Ix, Iy, and Iz may respectively correspond to an axis associated with cohort information (e.g., progression or history of problems for the cohort), an axis associated with the problems or disease progression of the patient, and an axis associated with the patient's familiarity with the AAC devices. In some aspect, the data outcomes 201 to 203 may further include information of the relevant AAC method. In some aspects, a list of the parameters or an output indexed by the combination of selected one from the parameters may be changed (or updated) when the system 1a learns as to what is more effective to the patient or the cohort.

Referring back to FIG. 1A, in some embodiments, the I/O device 10 may be embodied using (but is not limited to) a microphone (input), a headphone (output), a speaker (output), a smart watch (input/output), and an IoT device such as an artificial intelligence (AI) listener that works as a voice-controlled intelligent agent (or voice active speaker system).

Use of the AI listener for an I/O interface may allow a patient to interact with the speech enhancement system 1a in a more comfortable or flexible ways, while diagnosing or practicing (or exercising) according to suggested ameliorative actions. For example, patients who feel embarrassed for practicing in front of people or have difficulties in doing at their own comfortable pace may speak with the AI listener at any time, as desired, and the AI listener may provide coaching and assist to the patient. In some embodiments, the AI listener may be implemented using an avatar in a virtual world, or a voice-controlled intelligent agent such as an Amazon Echo™ device, a Google Home™ device, or the like. For example, patients may communicate with the avatar on screen (via a microphone interfaced to the system 1a) or with the voice-controlled intelligent agent such as the Amazon Echo™ device, the Google Home™ device, or the like.

The AI listener may be capable of voice interaction, music playback, making to-do lists, setting alarms, streaming podcasts, playing audiobooks, and providing weather, traffic and other real time information. The AI listener may also control several smart devices using itself as a home automation hub. In some aspects, the AI listener may provide feedback from the speech enhancement system 1a to not only a patient, but also to a healthcare professional, or may monitor and/or record speech sounds or words of the patient through daily voice interactions with the patient to provide the speech sounds or words to the system 1a as speech input data.

The AI listener may respond to a certain "wake word" (e.g., "Alexa" in Amazon Echo). The wake word can be changed by the patient to be more suitable to a person with special speech needs. In some embodiments, a microphone-enabled remote may be mounted to a wheel chair or other assistive device.

Figure 3:
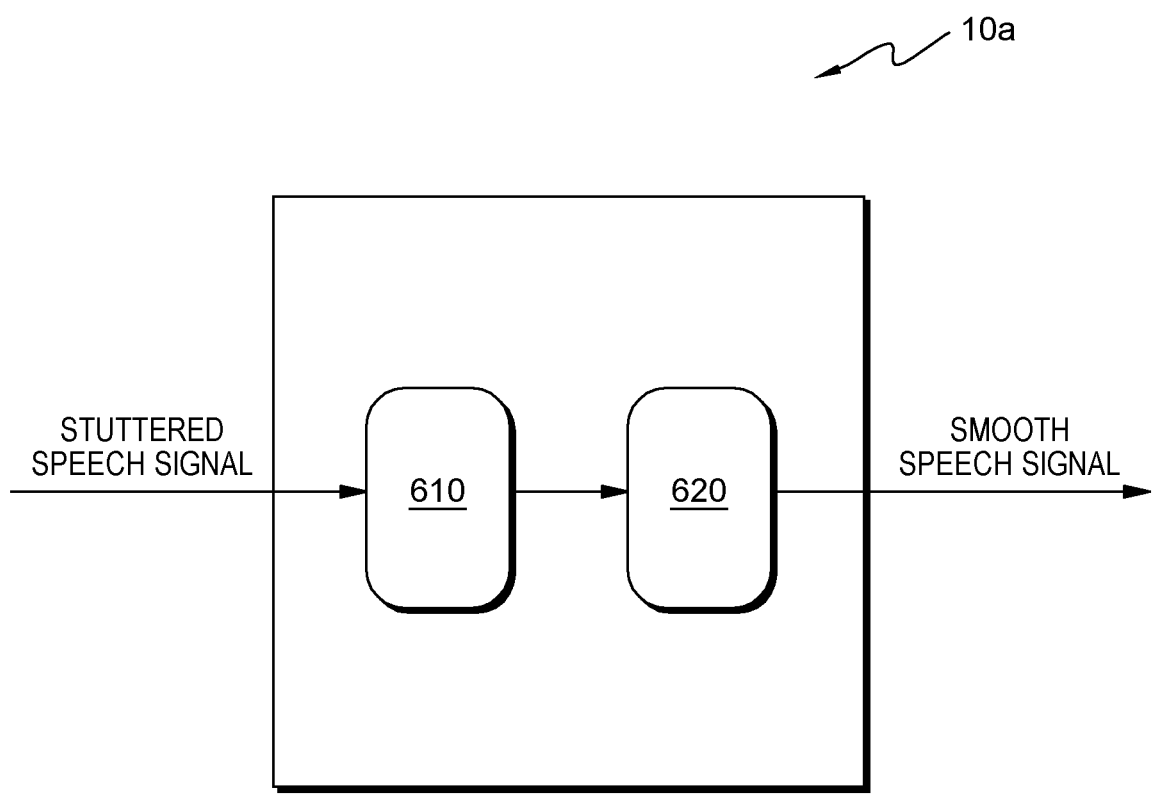
FIG. 3 depicts an example block diagram of a voice-controlled intelligent agent according to an exemplary embodiment of the present invention.

In some aspects, the AI listener may reconstruct a smooth speech signal from a stuttered speech signal. FIG. 3 depicts an example block diagram of an AI listener 10a according to an exemplary embodiment of the present invention. Referring to FIG. 3, the AI listener 10a may include a stuttered region identification block 610 where a stuttered region is identified from a received stuttered speech signal and a stuttered region reconstruction region 620 where the identified stuttered region is reconstructed, and thus a smooth speech signal can be provided to assist patients with speech problems in interacting with the AI listener 10a or the speech enhancement system 1a.

In some embodiments, depending on a degree of severity of speech disorder, the AI listener 10a can be trained. In one example, to improve a speech recognition accuracy, the AI listener 10a may learn speech patterns of patients with such speech disorder from various data (e.g., clinical data 52 of FIG. 1A) collected from other patients. In one example, patients may supply feedbacks to assist the AI listener 10a in learning, the AI listener 10a may learn optimal speech patterns for the command words from the feedbacks.

Figure 4A:
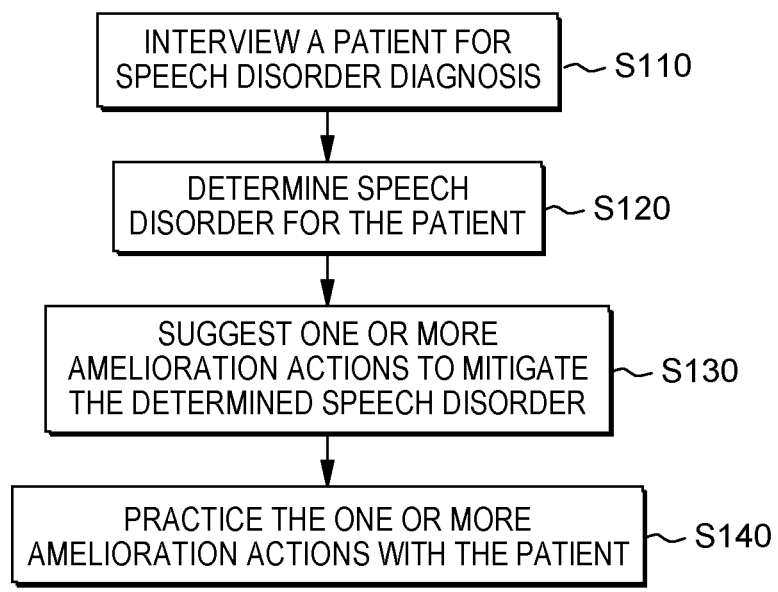
FIGS. 4A to 4C depict flow charts of a method for performing a speech performance enhancement according to an exemplary embodiment of the present invention.
Figure 4B:
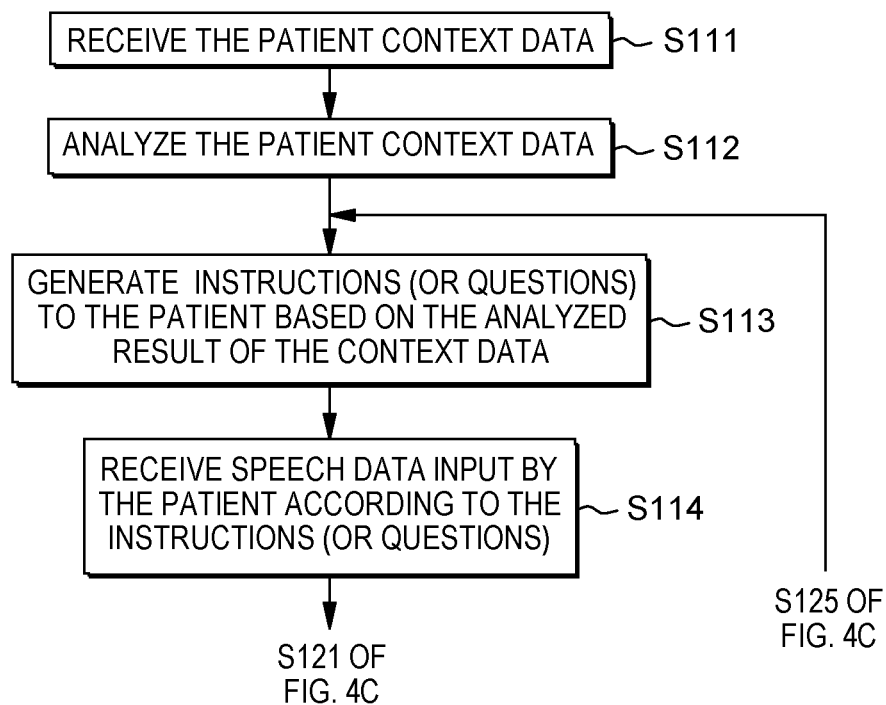
Figure 4C:
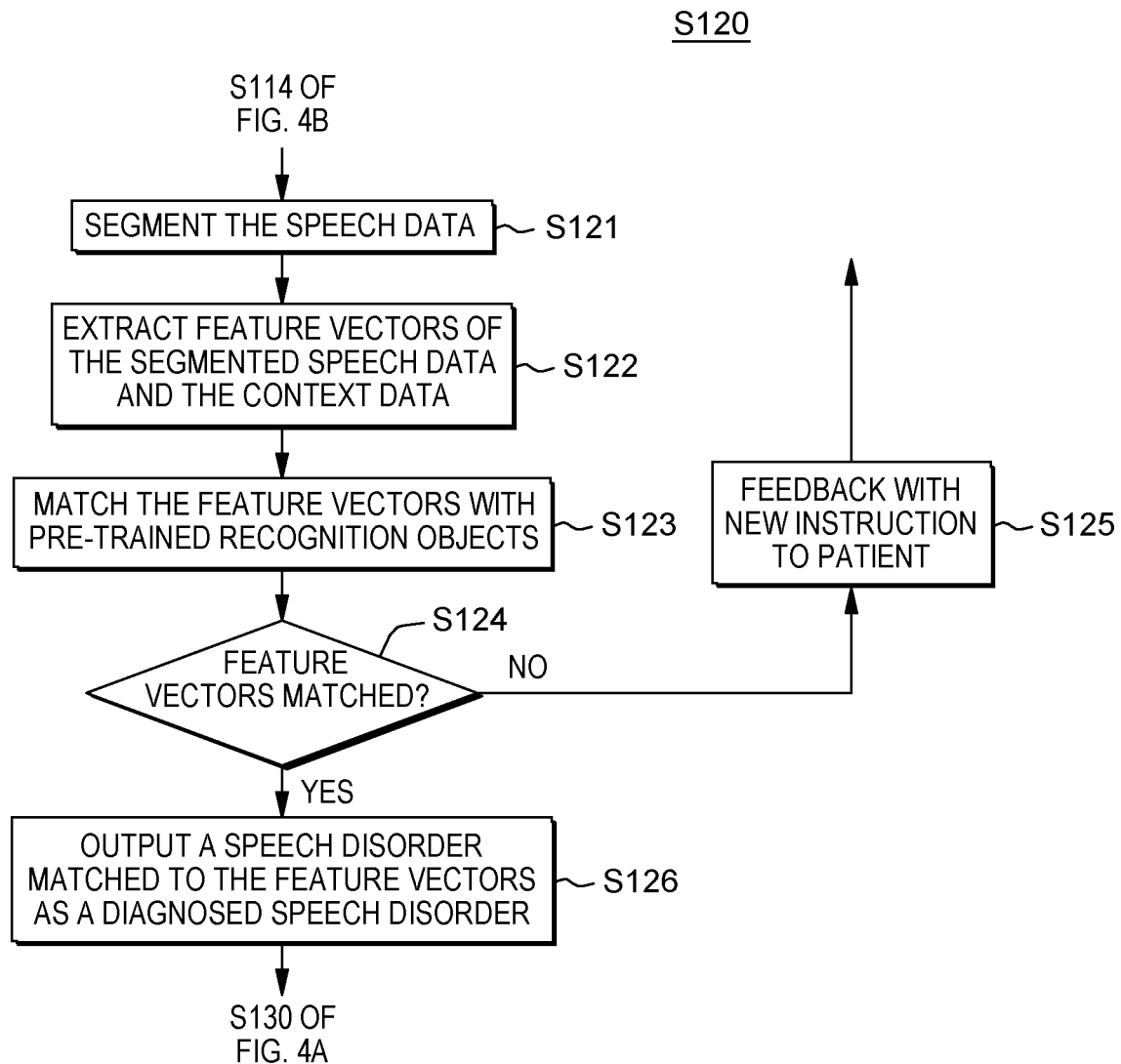

FIGS. 4A to 4C depict flow charts of a method for performing a speech performance enhancement according to an exemplary embodiment of the present invention. Referring now to FIG. 4A, at step S110, the speech enhancement system 1a (FIG. 1A) may perform an interview with a patient in which the patient provides audible responses into the system 1a. As depicted in FIG. 4B, the step S110 may include further sub-steps: receiving patient context data 51 (FIG. 1A) (S111); analyzing the patient context data 51 (S112); generating instructions (or questions) to the patient based on the analyzed result of the patient context data 51 (S113); and receiving the patient's speech data input according to the instructions (or questions) (S114). Returning now to FIG. 4A, at step S120, the speech enhancement system 1a may determine a speech disorder for the patient. As depicted in FIG. 4C, the step S120 may include further sub-steps: segmenting the speech data into, e.g., units of frame (S121), extracting feature vectors 311 (FIG. 1B) of the segmented speech data 111 (FIG. 1A) and the patient context data 51 (S122); matching (or comparing) the feature vectors 311 with pre-trained recognition objects in the learning engine 30 (S123). At step S124, a determination may be made as to whether the feature vectors match a recognition object. The step S120 may thus further include outputting a speech disorder matched to the feature vectors 311 as a diagnosed speech disorder (S126) in case of the feature vectors 311 do match to one of the recognition objects in the learning engine 30 (YES) and, otherwise (NO), communicating new instructions to the patient (S125). Again, returning to FIG. 4A, the speech enhancement system 1a may further include suggesting one or more ameliorative actions to correct (or mitigate) the determined speech order (S130) and practicing the one or more ameliorative actions with the patient (S140).

Figure 5:
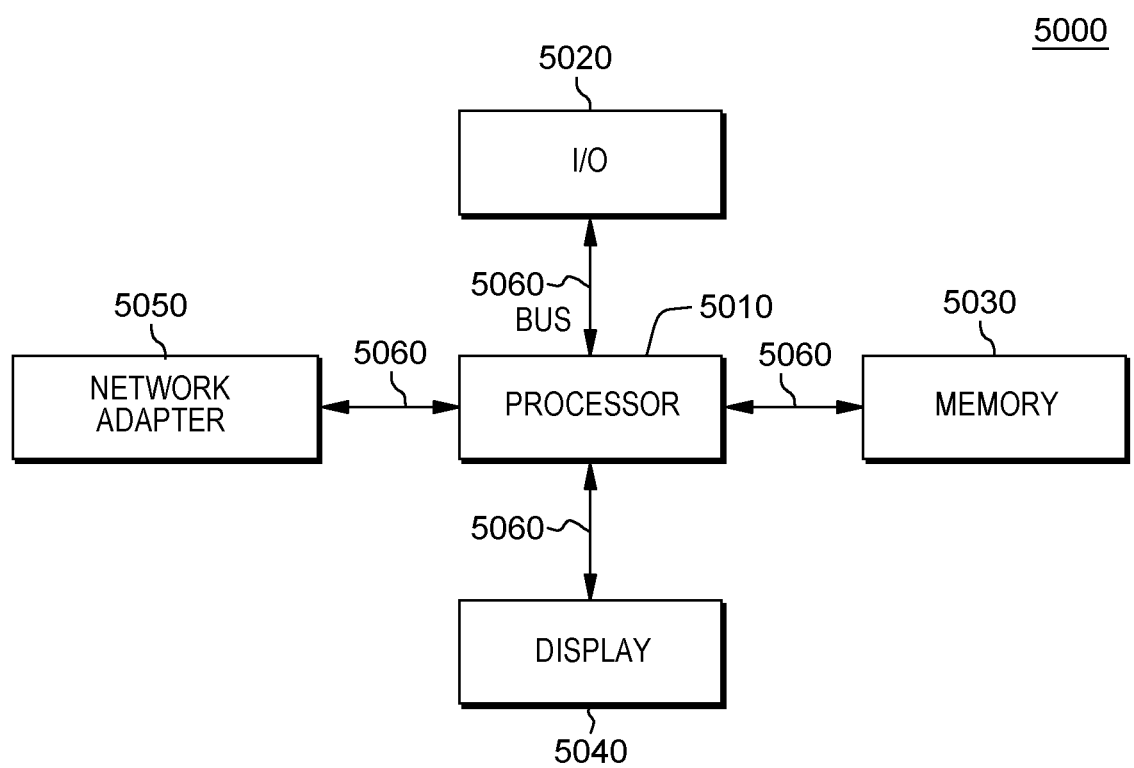
FIG. 5 is a block diagram of a computing system according to an exemplary embodiment of the present invention.

FIG. 5 is a block diagram of a computing system 5000 according to an exemplary embodiment of the present invention.

Referring to the example depicted in FIG. 5, the computing system 5000 may be used (without limitation) as a platform for performing (or controlling) the functions or operations described hereinabove with respect to the system 1a of FIG. 1A, and/or method of FIGS. 4A to 4C.

In addition (without limitation), the computing system 5000 may be implemented with an UMPC, a net-book, a PDA, a portable computer (PC), a web tablet, a wireless phone, a mobile phone, a smart phone, an e-book, a PMP, a portable game console, a navigation device, a black box, a digital camera, a DMB player, a digital audio recorder, a digital audio player, a digital picture recorder, a digital picture player, a digital video recorder, a digital video player, or the like.

Referring now specifically to FIG. 5, the computing system 5000 may include a processor 5010, I/O devices 5020, a memory system 5030, a display device 5040, bus 5060, and a network adaptor 5050.

The processor 5010 is operably coupled to and may communicate with and/or drive the I/O devices 5020, memory system 5030, display device 5040, and network adaptor 5050 through the bus 5060.

The computing system 5000 can communicate with one or more external devices using network adapter 5050. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The computing system 5000 may also include or access a variety of computing system readable media. Such media may be any available media that is accessible (locally or remotely) by a computing system (e.g., the computing system 5000), and it may include both volatile and non-volatile media, removable and non-removable media.

The memory system 5030 can include computer system readable media in the form of volatile memory, such as random access memory (RAM) and/or cache memory or others. The computing system 5000 may further include other removable/non-removable, volatile/non-volatile computer system storage media.

The memory system 5030 may include a program module (not shown) for performing (or controlling) the functions or operations described hereinabove with respect to the system 1a of FIG. 1A, and/or method of FIGS. 4A to 4C according to exemplary embodiments. For example, the program module may include routines, programs, objects, components, logic, data structures, or the like, for performing particular tasks or implement particular abstract data types. The processor (e.g., 5010) of the computing system 5000 may execute instructions written in the program module to perform (or control) the functions or operations described hereinabove with respect to the system 1a of FIG. 1A, and/or method of FIGS. 4A to 4C. The program module may be programmed into the integrated circuits of the processor (e.g., 5010). In some embodiments, the program module may be distributed among memory system 5030 and one or more remote computer system memories (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A computer-implemented method for enhancing speech performance, comprising:

communicating, via an input/output (I/O) device, speech data of a patient and receiving current context data associated with the patient, the current context data comprising a patient's demographics information;

segmenting, using a hardware processor, the speech data of the patient;

running, by the hardware processor, a model trained to learn mapping relationships among data comprising the patient's segmented speech data, said received patient's current context data, and corresponding diagnosed speech disorders comprising abnormal speech patterns collected from a cohort of the patient, and using the learned mapping relationships to pre-train one or more feature recognition objects for recognizing a speech disorder;

generating, using the trained model, one or more feature vectors from the patient's segmented speech data and said received patient's current context data;

determining whether the one or more generated feature vectors match with one or more said pre-trained feature recognition objects; and determining a speech disorder based on a matched result between the one or more feature vectors and the one or more pre-trained feature recognition objects;

receiving, at the hardware processor, said determined speech disorder and determining, based on said speech disorder, corresponding one or more ameliorative actions for mitigating the determined speech disorder, and communicating, via the I/O device, the one or more ameliorative actions for mitigating the determined speech disorder.

2. The method of claim 1, wherein the trained model is implemented based on a deep neural network (DNN).

3. The method of claim 1, wherein the communicating, via the I/O device, the one or more ameliorative actions further comprises using data selected from a group consisting of: patient context data, the clinical data, patient physical and emotional condition data, and patient progress data.

4. The method of claim 1, wherein the one or more feature vectors are generated further based on patient context data.

5. The method of claim 1, wherein the I/O device is implemented using at least one of a microphone, a headphone, a speaker, a smart watch, and an artificial intelligent (AI) listener device.

6. The method of claim 5, wherein the AI listener device is trained depending on a degree of severity of speech order.

7. The method of claim 5, wherein the AI listener device comprises: a stuttered region identification block identifying a stuttered region of speech data and a stuttered region reconstruction block reconstructing the stuttering region to provide a smooth speech signal.

8. The method of claim 1, further comprising:

storing, in an N-dimensional database (N is an integer greater than 1), an outcome comprising at least one of an ameliorative action, a therapeutic device that responds to said communicated one or more ameliorative actions, for assisting a patient, an alternative communication (AAC) device, and an identification of a healthcare professional which are appropriate to the patient; and selecting a combination of at least two parameters from N parameters, said at least two parameters selected to index an outcome comprising the at least one of the ameliorative action, the therapeutic device, and the identification of the healthcare professional, wherein the N parameters comprise:

a determined speech disorder for the patient;
whether the patient is alone or with a caregiver or aid;
physical characteristics of the patient;
whether the patient is familiar with the system, the therapeutic device or the AAC device;
a progression of problems for the patient;
a history of the problems for the patient;
a progression of problems for the patient cohort;
a history of the problems for the patient cohort; and
the patient context data.

9. The method of claim 3, wherein the demographics information is selected from a group consisting of:
a family background, language environment, age, gender, occupation, culture, and residential region.

10. The system of claim 8, wherein a list of the parameters or an output indexed by the combination of at least two parameters selected from the parameters in the N-dimensional database is changed based on the system learning what is more effective for the patient or the patient cohort.

11. The method of claim 1, wherein the I/O device receives the speech data from the patient responsive to one or more communications via the I/O device, the one or more communications generated based on patient context data.

12. The method of claim 1, further comprising:
detecting a patient's current emotional condition or mitigation progress responsive to said one or more ameliorative actions; and
adaptively changing ameliorative actions corresponding to the diagnosed speech disorder to be applied for the patient based on the patient's detected emotional condition or mitigation progress responsive to said one or more ameliorative actions.

13. The system of claim 8, wherein each of the at least two parameters from N parameters have a corresponding associated weight depending on a degree of importance, the hardware processor further configured to manage said list of the parameters according to respective weights.

* * * * *